(12) United States Patent
Wang et al.

(10) Patent No.: US 8,203,597 B2
(45) Date of Patent: Jun. 19, 2012

(54) PANORAMIC CAMERA

(75) Inventors: Wei-Jen Wang, Taipei Hsien (TW);
Shih-Pao Cheng, Taipei Hsien (TW)

(73) Assignee: Hon Hai Precision Industry Co., Ltd.,
Tu-Cheng, New Taipei (TW)

( * ) Notice: Subject to any disclaimer, the term of this patent is extended or adjusted under 35 U.S.C. 154(b) by 968 days.

(21) Appl. No.: 12/166,275

(22) Filed: Jul. 1, 2008

(65) Prior Publication Data
US 2009/0109279 A1  Apr. 30, 2009

(30) Foreign Application Priority Data
Oct. 26, 2007   (CN) .......................... 2007 1 0202279

(51) Int. Cl.
*H04N 7/00* (2006.01)
(52) U.S. Cl. .......................... 348/36; 396/20
(58) Field of Classification Search .............. 348/36; 396/20
See application file for complete search history.

(56) References Cited

U.S. PATENT DOCUMENTS

| | | | | |
|---|---|---|---|---|
| 3,537,372 A * | 11/1970 | Kaswan | .......................... | 396/22 |
| 5,650,813 A * | 7/1997 | Gilblom et al. | .................. | 348/36 |
| 5,668,593 A * | 9/1997 | Lareau et al. | .................. | 348/146 |
| 6,034,716 A * | 3/2000 | Whiting et al. | .................. | 348/36 |
| 6,144,406 A * | 11/2000 | Girard et al. | .................. | 348/211.4 |
| 6,192,196 B1 * | 2/2001 | Keller | .......................... | 396/20 |
| 6,639,625 B1 * | 10/2003 | Ishida et al. | .................. | 348/218.1 |
| 6,744,565 B1 * | 6/2004 | Kashitani et al. | .................. | 359/696 |
| 6,836,286 B1 * | 12/2004 | Tachi et al. | .................. | 348/36 |
| 7,609,808 B2 * | 10/2009 | Tornai et al. | .................. | 378/63 |
| 7,931,412 B2 * | 4/2011 | Brown | .......................... | 396/421 |
| 2001/0043264 A1 * | 11/2001 | Sinclair et al. | .................. | 348/36 |
| 2002/0057337 A1 * | 5/2002 | Kumler | .......................... | 348/47 |
| 2002/0071038 A1 * | 6/2002 | Mihelcic | .................. | 348/207 |
| 2004/0207840 A1 * | 10/2004 | Sharpe et al. | .................. | 356/244 |
| 2005/0005809 A1 * | 1/2005 | Neale | .......................... | 104/93 |
| 2005/0237383 A1 * | 10/2005 | Soga | .......................... | 348/36 |
| 2006/0015554 A1 * | 1/2006 | Umezaki et al. | .................. | 709/201 |
| 2006/0239677 A1 * | 10/2006 | Friedrich | .................. | 396/419 |
| 2008/0024594 A1 * | 1/2008 | Ritchey | .......................... | 348/36 |
| 2008/0068451 A1 * | 3/2008 | Hyatt | .......................... | 348/36 |

FOREIGN PATENT DOCUMENTS

CN  1851555 A  10/2006
WO  WO 2004012144 A1 *  2/2004

* cited by examiner

*Primary Examiner* — Alina N. Boutah
(74) *Attorney, Agent, or Firm* — Altis Law Group, Inc.

(57) ABSTRACT

An exemplary panoramic camera includes a support, a housing, a driver, an input unit, an imaging unit, a micro control unit (MCU), and a digital signal processor. The support includes a mounting base and a post extending from the mounting base. The housing is rotatably supported on the post. The input unit is for receiving user inputs. The MCU includes a parameter processor which converts user input into control signals according a viewing angle of the imaging unit, an imaging controller which controls the imaging unit to capture images at intervals according to the control signals, and a rotating controller which controls a rotation speed of the driver according to the control signals to ensure the housing is at desired locations during rotation in synchronization with the intervals. The digital signal processor combines the captured images into a panoramic image.

9 Claims, 2 Drawing Sheets

PANORAMIC CAMERA

BACKGROUND

1. Technical Field

The present invention relates to imaging technology, and particularly to a panoramic camera.

2. Description of the Related Art

Some cameras are configured for taking panoramic images by combining a series of individual images taken in different directions at pre-configured intervals, for example, roughly 30 degrees. For taking the individual images, the cameras are automatically or manually rotated about a vertical axis at a pre-configured speed. Conventionally, the pre-configured intervals and rotation speed are fixed and cannot be changed to meet requirements.

What is needed, therefore, is a panoramic camera which can overcome the above-described deficiency.

SUMMARY

A panoramic camera includes a support, a housing, a driver, an input unit, an imaging unit, a micro control unit (MCU), and a digital signal processor. The support includes a mounting base and a post extending from the mounting base. The housing is rotatably supported on the post. The input unit is for receiving user input. The micro control unit includes a parameter processor which converts user input into control signals according a viewing angle of the imaging unit. The MCU also includes an imaging controller which controls the imaging unit to capture images at intervals according to the control signals, and a rotating controller which controls a rotation speed of the driver according to the control signals to ensure the housing is at desired locations during rotation in synchronization with the intervals. The digital signal processor combines the captured images into a panoramic image.

Other advantages and novel features will be drawn from the following detailed description of at least one preferred embodiment, when considered in conjunction with the attached drawings.

BRIEF DESCRIPTION OF THE DRAWINGS

Many aspects of the present panoramic camera can be better understood with reference to the accompanying drawings. The components in the drawings are not necessarily drawn to scale, the emphasis instead being placed upon clearly illustrating the principles of the present panoramic camera. Moreover, in the drawings, like reference numerals designate corresponding parts throughout the several views.

DETAILED DESCRIPTION OF THE EXEMPLARY EMBODIMENTS

Embodiments of the present panoramic camera will now be described in detail below with reference to the drawings.

Figure 1:
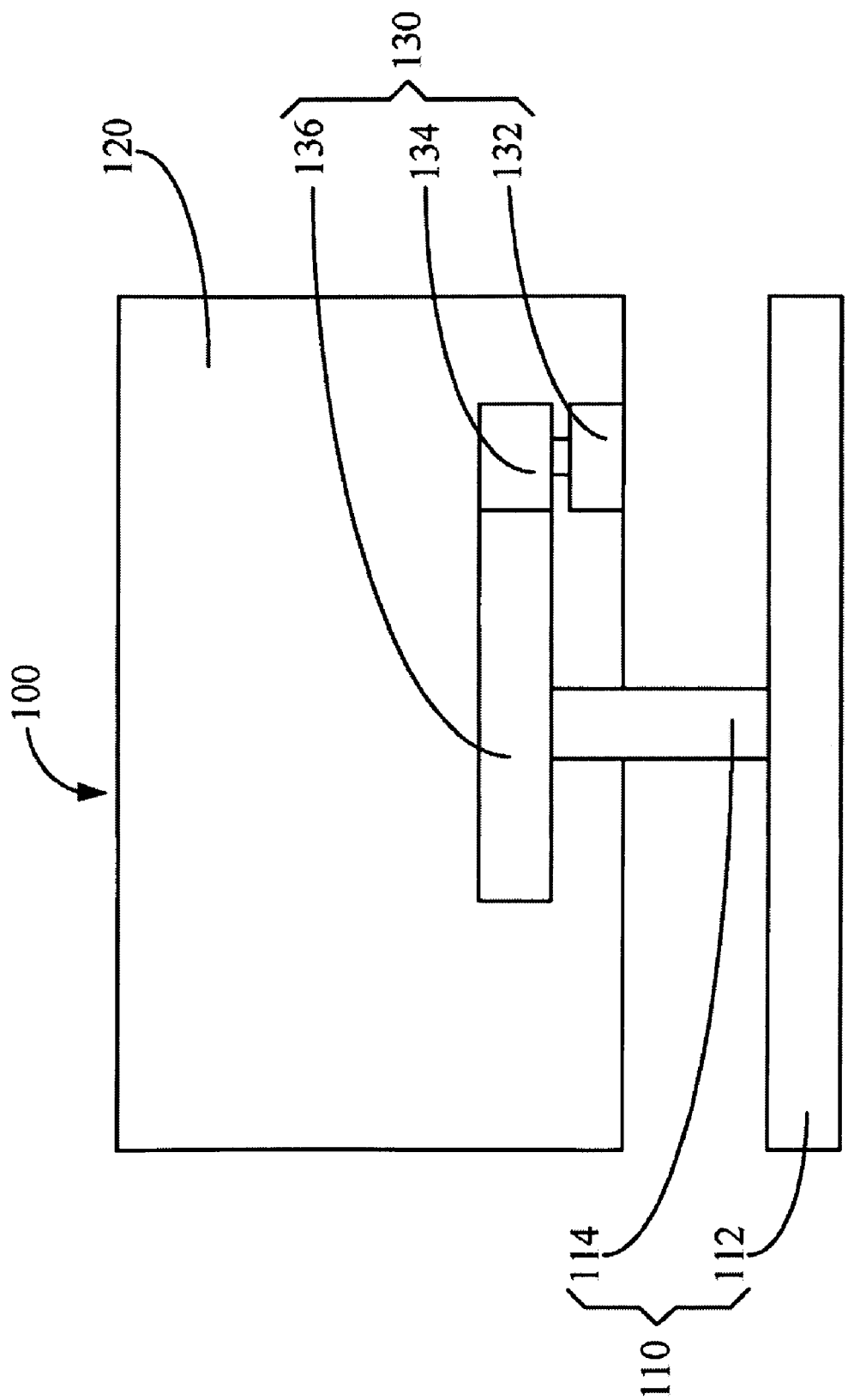
FIG. 1 is a schematic plan view of a panoramic camera, according to a present embodiment.
Figure 2:
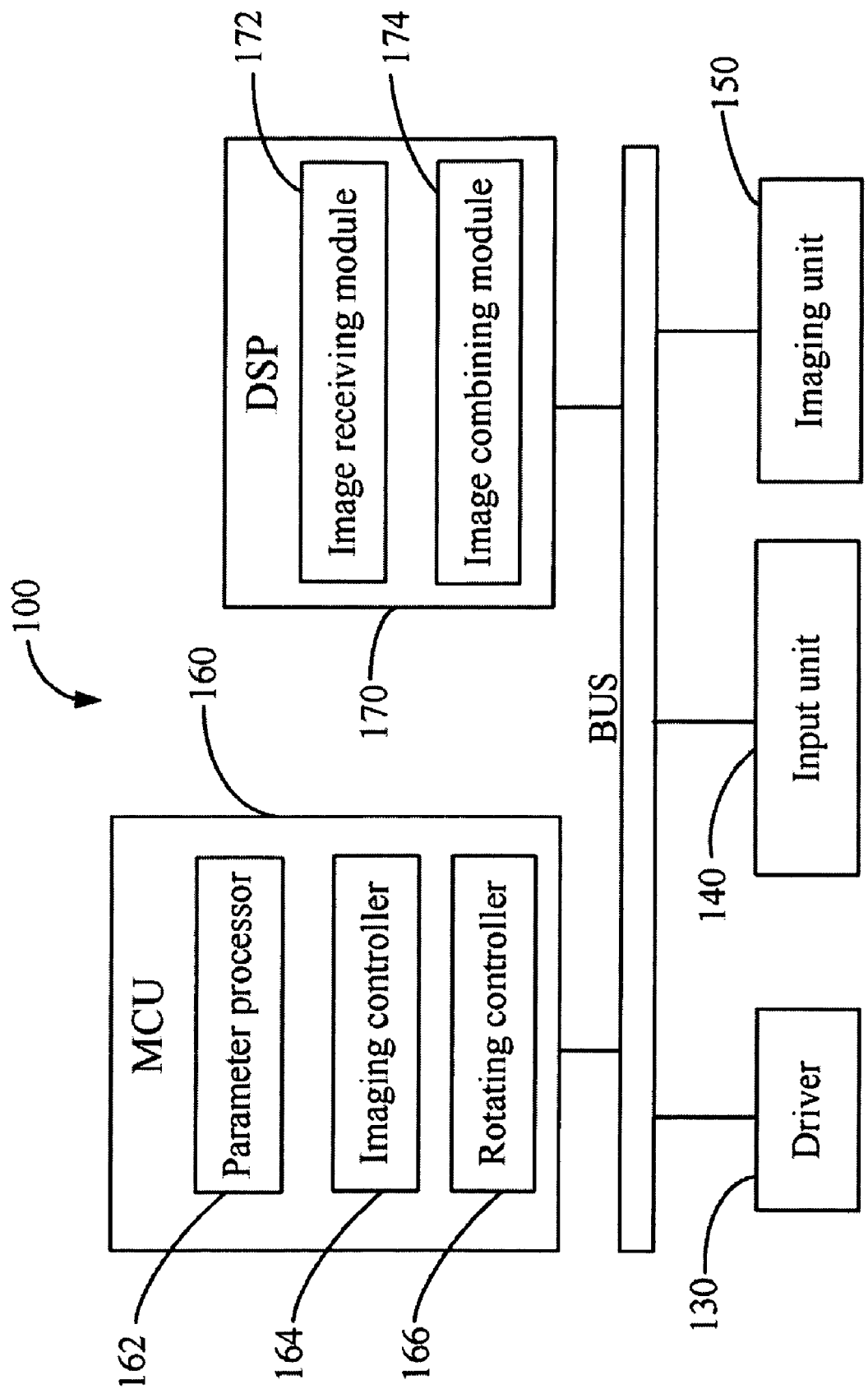
FIG. 2 shows functional blocks of the panoramic camera of FIG. 1.

Referring to FIGS. 1 and 2, a panoramic camera 100, according to a present embodiment, includes a support 110, a housing 120, a driver 130, an input unit 140, an imaging unit 150, a micro control unit (MCU) 160, and a digital signal processor (DSP) 170. The housing 120 is rotatably supported on the support 110. The input unit 140 and the imaging unit 150 are mounted on the housing 120 and electrically connected to the MCU 160. The input unit 140 is configured for receiving user input, and thereby instructing the MCU 160 to control the driver 130 to drive the housing 120 to rotate at a certain speed and the imaging unit 150 to capture images at certain intervals. The DSP 170 is configured for combining the captured images into a panoramic image. The MCU 160 and the DSP 170 can be alternatively mounted on the support 110 or the housing 120.

Referring to FIG. 1, the support 110 includes a mounting base 112, and a post 114. The mounting base 112 is configured for positioning the panoramic camera 100 to, for example, a tripod (not shown). The post 114 is extended perpendicularly from the mounting base 112. The housing 120 is rotatably fixed to the post 114. The driver 130 is disposed within the housing 120, and includes a motor 132, and two gears 134 and 136. The motor 132 is fixed to the housing 120 with its axis of rotation parallel to the post 114, and can be powered on when the panoramic camera 100 works in a panoramic mode. The two gears 134 and 136 are respectively fixed to an output shaft of the motor 132 and the post 114, so that the housing 120 can be driven to rotate about the post 114 when the motor 132 is powered on.

The input unit 140 can be a keypad or a touch-screen for receiving user inputs. Thereby, parameters, such as viewing angle desired in the combined panoramic image and at what intervals to capture individual images, can be set by the user via the input unit 140. The parameters can be used to determine a rotation speed of the driver 130 according to selected viewing angle of the imaging unit 150. The input unit 140 can also be configured for receiving user input to trigger the panoramic mode.

The imaging unit 150 is configured for capturing individual images.

The MCU 160 is configured for processing user input from the input unit 140, and thereby controlling the panoramic camera 100 to capture individual images. The MCU 160 comprises a parameter processor 162, an imaging controller 164, and a rotating controller 166. The parameter processor 162 is configured for obtaining user inputs from the input unit 140 and converting user input into control signals according to selected viewing angle of the imaging unit 150. The imaging controller 164 is configured for controlling the imaging unit 150, according to the control signals, to capture images at the selected intervals. The rotating controller 166 is configured for controlling the rotation speed of the driver 130, to ensure the housing 120 is at a desired location during rotation in synchronization with the intervals, so that the imaging unit 150 can capture a sequence of individual images that can be seamlessly combined into a panoramic image.

The DSP 170 is configured for receiving the individual images from the imaging unit 150 and sequentially stitching the individual images into the combined panoramic image. The DSP 170 comprises an image receiving module 172, and an image combining module 174. The imaging receiving module 172 is configured for receiving the chain of images captured by the imaging unit 150. The image combining module 174 is configured for combining the sequence of images together to achieve the combined panoramic image, by assistance of software stored in the panoramic camera 100, for example, PTGui.

It will be understood that the above particular embodiments and methods are shown and described by way of illustration only. The principles and features of the present invention may be employed in various and numerous embodiments thereof without departing from the scope of the invention as claimed. The above-described embodiments illustrate the scope of the invention but do not restrict the scope of the invention.

What is claimed is:

1. A panoramic camera comprising:

a support, a housing, a driver disposed within the housing, an input unit, an imaging unit, a micro control unit, and a digital signal processor;

wherein the support comprises a mounting base and a post extending from the mounting base, the driver comprises a motor fixed to the housing with its axis of rotation parallel to the post, and two gears respectively fixed to the motor and the post, the input unit is configured for receiving user inputs, the micro control unit comprises a parameter processor which converts user input into control signals according a viewing angle of the imaging unit, an imaging controller which controls the imaging unit to capture images at intervals according to the control signals, and a rotating controller which controls a rotation speed of the driver according to the control signals to ensure the housing is at desired locations during rotation in synchronization with the intervals, the digital signal processor combines the captured images into a panoramic image.

2. The panoramic camera as claimed in claim 1, wherein the input unit and the imaging unit are mounted on the housing.

3. The panoramic camera as claimed in claim 1, wherein the micro control unit is alternatively mounted on the support or the housing.

4. The panoramic camera as claimed in claim 1, wherein the digital signal processor is alternatively mounted on the support or the housing.

5. The panoramic camera as claimed in claim 1, wherein the motor is capable of driving the housing to rotate about the post, when the panoramic camera works in a panoramic mode.

6. The panoramic camera as claimed in claim 1, wherein the input unit is configured for triggering the panoramic camera to work in a panoramic mode.

7. The panoramic camera as claimed in claim 1, wherein user input comprises viewing angle desired in the combined panoramic image.

8. The panoramic camera as claimed in claim 1, wherein the digital signal processor comprises an image receiving module for receiving individual images and an image combining module for combining the individual images into a panoramic image.

9. The panoramic camera as claimed in claim 8, wherein the image combining module uses PTGui software in creating the panoramic image.

\* \* \* \* \*